(12) United States Patent
Gandham

(10) Patent No.: US 8,111,648 B2
(45) Date of Patent: *Feb. 7, 2012

(54) HETEROGENEOUS MAC PROTOCOL FOR FORWARDING VOIP TRAFFIC ON WIRELESS NETWORKS

(75) Inventor: Shashidhar R. Gandham, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 785 days.

This patent is subject to a terminal disclaimer.

(21) Appl. No.: 12/069,057

(22) Filed: Feb. 7, 2008

(65) Prior Publication Data

US 2008/0192708 A1 Aug. 14, 2008

Related U.S. Application Data

(60) Provisional application No. 60/900,219, filed on Feb. 8, 2007.

(51) Int. Cl.
*H04J 3/08* (2006.01)
*H04J 3/00* (2006.01)
*H04J 3/16* (2006.01)
*G06F 15/16* (2006.01)

(52) U.S. Cl. ......... 370/326; 370/336; 370/346; 709/228
(58) Field of Classification Search ................ 370/345
See application file for complete search history.

(56) References Cited

U.S. PATENT DOCUMENTS

| | | | |
|---|---|---|---|
| 5,384,777 A | 1/1995 | Ahmadi et al. | |
| 6,671,264 B1 | 12/2003 | Yonge, III et al. | |
| 2003/0018794 A1* | 1/2003 | Zhang et al. | 709/231 |
| 2004/0213191 A1* | 10/2004 | Lee | 370/338 |
| 2004/0218620 A1* | 11/2004 | Palm et al. | 370/445 |
| 2005/0220131 A1* | 10/2005 | Ginzburg et al. | 370/432 |
| 2006/0007876 A1* | 1/2006 | Qian et al. | 370/320 |
| 2006/0014492 A1* | 1/2006 | Del Prado Pavon et al. | 455/41.2 |
| 2006/0029073 A1* | 2/2006 | Cervello et al. | 370/389 |
| 2006/0045048 A1* | 3/2006 | Kwon et al. | 370/329 |
| 2006/0062181 A1* | 3/2006 | Chou | 370/329 |
| 2006/0187873 A1* | 8/2006 | Friday et al. | 370/328 |
| 2008/0171550 A1* | 7/2008 | Zhao | 455/445 |

* cited by examiner

*Primary Examiner* — Andrew Chriss
(74) *Attorney, Agent, or Firm* — Dennis L. Cook, Esq.

(57) ABSTRACT

This disclosure describes a new Medium Access Control (MAC) protocol that combines contention-free and contention-based MAC protocols into a heterogeneous MAC protocol used for forwarding VoIP traffic in VoIP systems on wireless networks which addresses the need to transport high bit-rate data to multiple users over wired and wireless means.

4 Claims, 1 Drawing Sheet

HETEROGENEOUS MAC PROTOCOL FOR FORWARDING VOIP TRAFFIC ON WIRELESS NETWORKS

CROSS-REFERENCE TO RELATED APPLICATION

The present application claims the benefit of previously filed Provisional Patent Application Ser. No. 60/900,219, filed Feb. 8, 2007.

FIELD OF THE INVENTION

This invention addresses the need to transport high bit-rate data and voice to multiple users over wired and wireless means. Specifically, this disclosure describes a new MAC protocol that combines contention-free and contention-based MAC protocols for use in VoIP systems.

BACKGROUND OF THE INVENTION

Modulation is the fundamental process in any communication system. It is a process to impress a message (voice, image, data, etc.) on to a carrier wave for transmission. A band-limited range of frequencies that comprise the message (baseband) is translated to a higher range of frequencies. The band-limited message is preserved, i.e., every frequency in that message is scaled by a constant value. The three key parameters of a carrier wave are its amplitude, its phase and its frequency, all of which can be modified in accordance with an information signal to obtain the modulated signal.

There are various shapes and forms of modulators. For example conventional Amplitude Modulation uses a number of different techniques for modulating the amplitude of the carrier in accordance with the information signal. These techniques have been described in detail in "Modem Analog and Digital Communication Systems" by B. P. Lathi. Similarly conventional Frequency/Phase Modulation uses a number of different methods described in a number of textbooks. In all these techniques, carrier (which is a high frequency sinusoidal signal) characteristics (either amplitude, frequency, phase or combination of these) are changed in accordance with the data (or information signal). Thus there have been two major components of a modulated signal. One is the information-carrying signal and the other is the high frequency carrier.

Communication systems that have emerged in recent years include mono-pulse and Ultra-Wide Band communication systems. The problem with these systems is that all mono-pulse or Ultra-Wide Band communications systems form Power Spectrum Densities that tend to span very wide swaths of the radio spectrum. For instance the FCC has conditionally allowed limited power use of UWB from 3.2 GHz to 10 GHz. These systems must make use of very wide sections of radio spectrum because the transmit power in any narrow section of the spectrum is very low. Generally any 4 KHz section of the affected spectrum will contain no more than −42 dbm of UWB spectral power. Correlating receivers are used to "gather" such very wide spectral power and concentrate it into detectable pulses. Interfering signals are problematic. Since the communication system is receiving energy over a very wide spectrum, any interfering signal in that spectrum must be tolerated and mitigated within the receiver. Many schemes exist to mitigate the interference. Some of these include selective blocking of certain sections of spectrum so as not to hear the interferer, OFDM schemes that send redundant copies of the information in the hope that at least one copy will get through interference, and other more exotic schemes that require sophisticated DSP algorithms to perform advanced filtering. In addition, UWB systems have somewhat of a "bad reputation" because they at least have the potential to cause interference. A heated discourse has gone on for years over the potential that UWB systems can cause interference to legacy spectrum users.

Tri-State Integer Cycle Modulation (TICM) and other Integer Cycle Modulation techniques, which has now become known by its commercial designation, xMax, were designed by xG Technology, Inc., the Assignee of this application to help alleviate this massive and growing problem. Its signal characteristics are such that absolute minimal sideband energy is generated during modulation but that its power spectrum density is quite wide relative to the information rate applied. Also, a narrower section of the power spectrum output can be used to represent the same information. The Heterogeneous MAC protocol disclosed herein is primarily applicable to these types of integer cycle and pulse modulation systems.

BRIEF SUMMARY OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006 and is now known by its commercial designation, xMax. This new wireless physical layer technology developed by xG Technology LLC, referred to as xMAX, enables extremely low power omni-directional transmissions to be received in a wide area. Using xMAX, significant bandwidth can be made available for supporting various wireless applications. Voice Over IP (VOIP) based cellular services are now being developed using xMAX. In xMAX-based cellular networks both the base station and the handsets will be equipped with an xMAX transceiver. A mobile device (XMAX handset) in such a network will be free to move in the radius covered by an xMAX base station.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

The new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VOIP) based cellular services are now being developed using xMAX. In xMAX-based cellular networks both the base station and the handsets will be equipped with an xMAX transceiver. A mobile device (XMAX handset) in such a network will be free to move in the radius covered by an xMAX base station.

Figure 1:
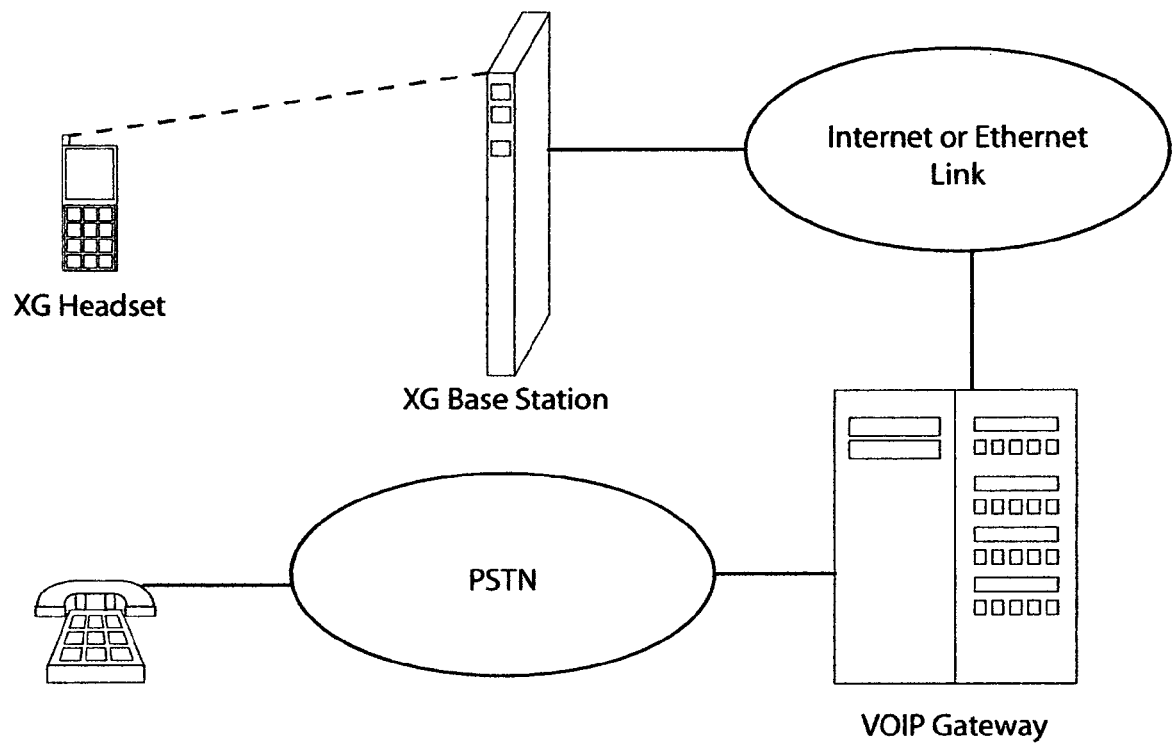
FIG. 1 is a representation of an xMax deployment scenario.

In VOIP-based cellular networks xMAX handsets (or mobile nodes) will be equipped with the complete VOIP stack. The xMAX base station will be connected to the Internet through an Ethernet port. The mobile nodes will communicate with the xMAX base station to reach a VOIP gateway. FIG. 1 depicts the deployment scenario. To enable communication between an xMAX handset and an xMAX base station we need a MAC (Medium Access Control) protocol that is optimized for VOIP traffic.

MAC protocols for wireless networks can be broadly classified as contention-free and contention-based MAC protocols.

In contention-based MAC protocols, like Carrier Sense Multiple Access with Collision Avoidance (CSMA/CA) and 802.11(b), wireless nodes contend for access to the medium. These techniques have been described in detail in Andrew S. Tanenbaum, Computer Networks 4th Edition, Prentice Hall and LAN MAN Standards Committee of the IEEE Computer Society Wireless LAN medium access control (MAC) and physical layer (PHY) specification, *IEEE*, New York, N.Y., USA, *IEEE Std.* 802.11, 1997. Due to collisions a packet might have to be transmitted multiple times before the intended destination node successfully receives it. As a result, the latency incurred in forwarding a packet is non-deterministic (jitter) and can vary over a wide range depending on the network-load. As the quality of voice sessions degrades with increased jitter contention-based MAC protocols are not suitable for VOIP.

An experimental study by Miroslaw Narbutt and Mark Davis on an 802.11(b) network shows that at most 15 simultaneous VOIP calls can be supported. The details of this study can be found in Effect of Free Bandwidth on VOIP Performance in 802.11(b) WLAN Networks, *IEEE Irish Signals and Systems Conference, Dublin*, 2006. There is a need to build networks wherein each base station supports about 500 voice calls simultaneously. As contention-based MAC protocols do not require prior knowledge of data-rates and synchronization between sender and receiver they are suitable for forwarding signaling traffic (like SIP and RTCP) and application data (like SMS and e-mail).

Contention-free MAC protocols like TDMA ensure that every node in the network gets a fair and guaranteed access to the medium. In addition, the latency incurred in forwarding a packet is always bounded and is known a priori. Hence, no jitter is introduced while packets are forwarded on the wireless links. Thus TDMA is a suitable MAC protocol for forwarding voice traffic in wireless networks.

Note that the signaling traffic is generated sporadically and it is not possible to predict it a priori. On the other hand voice-traffic is generated continuously. A MAC protocol is needed that can support these traffic characteristics. In addition, the MAC protocol should be able forward data generated by SMS, e-mail and web browsing applications running on the mobile device.

What is disclosed in this application is a heterogeneous MAC protocol, referred to as xMAC, for supporting VOIP on xMAX networks. xMAC is a combination of TDMA and CSMA/CA. Guaranteed timeslots are assigned for each mobile device to forward voice traffic. To forward signaling traffic and application data, the nodes contend for channel access. Signaling traffic is assigned a higher priority over application data in gaining access to the channel.

Figure 2:
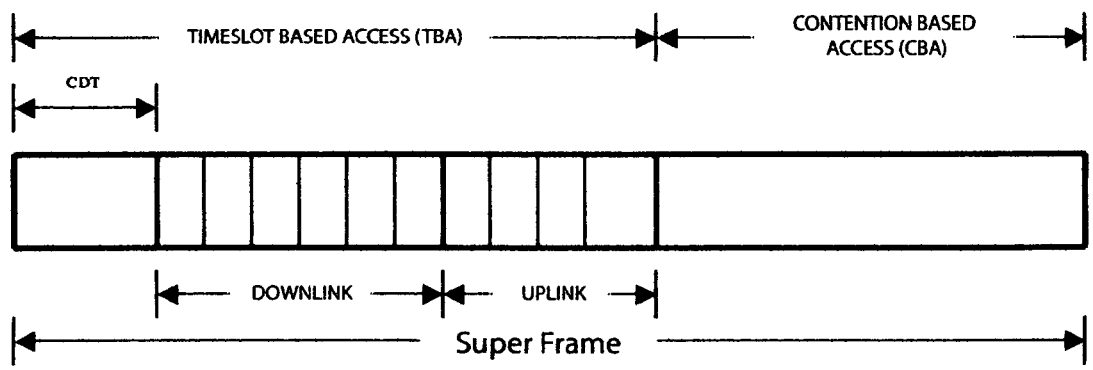
FIG. 2 is a representation of a super-frame format in xMAC.

In xMAC the time domain is sliced into equal intervals of time. Each time interval is referred to as a super-frame as shown in FIG. 2. The initial part of the super-frame is reserved for Timeslot Based Access (TBA). The remaining part of the super-frame is meant for Contention Based Access (CBA). During CBA the nodes employ CSMA/CA with binary exponential back off.

The base station dynamically decides the duration of a super-frame and TBA. The duration of a super-frame depends on the duration of speech, referred to as the packetization interval, that is carried in each packet. For example if 30 ms of speech were sent in each packet then the duration of the super-frame would be 30 ms. Note that each timeslot is long enough to transmit exactly one packet. By having a super-frame of 30 ms duration we can ensure that a voice packet is forwarded as soon as it is generated. As a result no significant delay is introduced in forwarding the packet over the xMAX network.

The duration of TBA depends on the number of mobiles involved in a voice session and the number of packets the base station has to forward to the mobile nodes. The TBA is subdivided into three parts: (1) Control Data Timeslot (CDT), (2) downlink timeslots, and (3) uplink timeslots.

In CDT the base station will transmit control information regarding the current super frame. Control information can include: (a) duration of the current super-frame, (b) duration of the CDT, (c) duration of the TBA, (d) duration of the timeslots and (c) changes in timeslot assignment from the previous super-frame. Timeslot assignment in successive super-frames might change because of a new voice session, completion/termination of an existing voice session, and a few other instances as will be explained below. Notification of an incoming call is also announced in the CDT.

When multiple xMAX base stations are deployed in the same geographical area, the CDT is used to exchange messages between base stations that interfere with each other. The base station forwards voice packets to the mobile nodes in downlink timeslots. Mobile nodes forward voice packets to the base station in uplink timeslots. The base station announces the uplink and downlink timeslot assignments in CDT.

Note that all the mobile nodes in the xMAX network have to switch their transceivers into receive mode during CDT of every super-frame. In addition, mobiles switch their transceivers in receive (resp. transmit) mode during their assigned downlink (resp. uplink) timeslots. For the rest of the super-frame the mobile nodes can switch off their transceivers to save power.

During CBA the nodes employ CSMA/CA with binary exponential back off. CBA is used for forwarding signaling packets and application data packets. In addition xMAX control messages are also transmitted during CBA. xMAX control messages are exchanged between base station and mobile nodes when: (1) nodes join/leave the network, and (2), nodes initiate a voice session. Highest priority for access to the medium is given to xMAX control messages. Signaling messages get the next highest priority. Data from applications that can tolerate significant delays are assigned the least priority. To provide required service differentiation for various types of messages different contention window sizes are employed as prescribed by 802.11(e). The details about 802.11(e) can be found in IEEE 802.11 WG. *Draft Supplement to Standard for Telecommunications and Information Exchange between System*, Medium Access Control (MAC) Enhancements for Quality of Service (QoS), IEEE 802.11e/D2.0, November, 2001.

Above it is mentioned that super-frame duration is determined by the packetization interval. By setting the super-frame duration the same as the packetization interval we ensure that as soon as a voice packet is generated at the handset it is forwarded to the base station. In the worst case each packet experiences a maximum delay of a super-frame duration on the xMAX network.

However, similar claims cannot be made about the packets forwarded by the base station. Note that the packets received by the base station from the Ethernet port might traverse an IP network. IP packets might be buffered at some routers for longer durations of time. As a result, the base station might receive IP packets in bursts. Hence during certain super-frames the base station might not have any data to forward to a handset. During other super-frames the base station might have a high number of packets buffered. However only one packet might be sent in each super-frame. As a result, the packets might experience more latency than the super-frame duration. Assigning more timeslots and forwarding all the packets in one super-frame might not result in better voice quality because the handset has to play the RTP payload one after another and each RTP payload carries a super-frame duration of voice. A threshold on the size of the buffer for packets of each handset is set. If the number packets that are to be buffered exceeds this threshold then some packets are dropped at the base station. The packets that would be dropped can be (i) those at the head of the queue, (ii) those at the tail of the queue, and (iii), selected randomly.

In an IP network packets between the same source and destination pairs might traverse different routes. Hence, the latency incurred by the packets might be different. The base station might receive RTP packets out of order. Forwarding the packets in the same order that they are received at the base station might not be the best possible approach. Thus the IP packets are sorted based on the time stamp in the RTP header. In a timeslot the packet with the least time stamp is forwarded.

Thus what is disclosed, and identified as xMAC, is a heterogeneous MAC protocol for forwarding VOIP traffic on xMAX networks. xMAC is a combination of TDMA and CSMA/CA. Timeslots are assigned for uplink and downlink transmissions of voice packets. Signaling messages, xMAX control messages, and application data are forwarded using CSMA/CA with exponential back off. The base station can dynamically change all the parameters of the super-frame, including timeslots allocated to handsets. The base station announces the changes in a super-frame during the control data timeslot.

Since certain changes may be made in the above described MAC protocol that combines contention-free and contention-based MAC protocols for use in VoIP systems without departing from the scope of the invention herein involved, it is intended that all matter contained in the description thereof or shown in the accompanying figures shall be interpreted as illustrative and not in a limiting sense.

What is claimed is:

1. A method of signaling protocol between transceivers that eliminates latency in sending voice packets over RF signals and greatly improves the voice quality of service using a medium access control protocol that combines contention-free and contention-based medium access control protocols into a heterogeneous medium access control protocol used for forwarding Internet Protocol packets containing voice traffic, signaling traffic, and application data traffic between a base station and mobile nodes in a voice over internet protocol system on a wireless network comprising:

a base station in electrical communication with the Internet;
one or more mobile nodes in wireless electrical communication with said base station;
said base station and said one or more mobile nodes each having a medium access control protocol;
said medium access control protocol having super-frames of equal intervals of time;
each of said super-frames made up of an initial time for contention-free timeslot based access voice traffic and a remainder time for contention-based access signaling traffic and application data traffic;
said base station dynamically determining a time duration of said super-frames and said initial time for contention-free timeslot based access based on a packetization interval determined by the duration of the voice traffic in said Internet Protocol packets for each of said super-frames such that each of said super-frames is long enough to transmit exactly one voice traffic packet and then said mobile node forwarding said voice traffic packet after each said voice traffic packet is generated;
said initial time for contention-free timeslot based access then being divided into a control data timeslot, a downlink timeslot, and an uplink timeslot wherein the control data timeslot contains information regarding a current super-frame of said super-frames and said one or more mobile nodes are all capable of receiving said information during said control data timeslot in each of said super-frames;
said contention-based access then containing control messages transmitted between said base station and said one or more mobile nodes when said one or more mobile nodes join or leave the wireless network or initiate a voice session;
said one or more mobile nodes then using carrier sense multiple access with collision avoidance with binary exponential back off contention-based access; and,
wherein said control messages are then assigned a highest priority, said signaling traffic are then assigned a lower priority, and said data application messages are then assigned a lowest priority.

2. The method of claim 1 wherein a limit is set on the number of said Internet Protocol packets for each of said one or more mobile nodes such that if the number of said Internet Protocol packets to be sent by said base station to said one or more mobile nodes exceeds the limit said base station will drop one or more of said Internet Protocol packets.

3. The method of claim 1 wherein said Internet Protocol packets contain a time stamp and are sorted by said base station according to said time stamp and then send to said one or more mobile nodes in accordance with said time stamp such that said Internet Protocol packet with the earliest time stamp is send before later time stamped Internet Protocol packets.

4. The method of claim 1 further comprising one or more additional base stations in said wireless network and wherein said control data timeslot is used to transmit messages between said base station and said one or more additional base stations.

* * * * *